May 24, 1927.
L. F. BURKE
LOCK HOLDER
Filed March 2, 1926
1,629,859
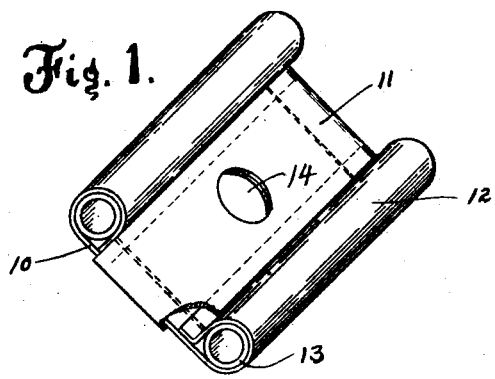
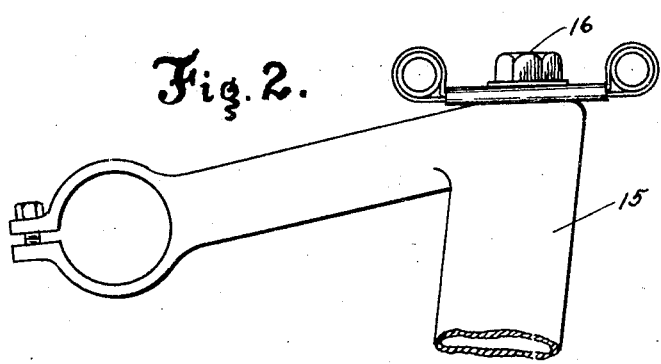
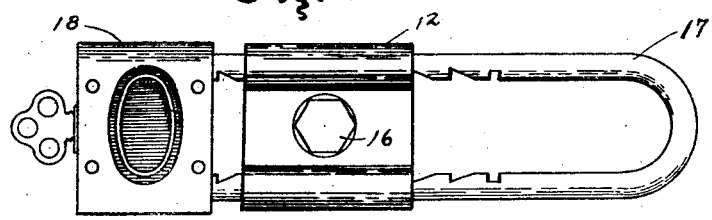
INVENTOR
Lot F. Burke
BY W. H. Atkinson
ATTORNEY Patented May 24, 1927.

1,629,859

UNITED STATES PATENT OFFICE.

LOT F. BURKE, OF SCHENECTADY, NEW YORK.

LOCK HOLDER.

Application filed March 2, 1926. Serial No. 91,823.

This invention relates to a new form of holder and is designed to hold a lock when the same is not in use and more particularly this holder is designed for holding a bicycle lock of the type commonly used for this purpose, that is, those which are provided with a long shackle which can be inserted through the spokes of a wheel and about the frame of the bicycle.

One of the objects of this invention is to provide a holder for locks of the above type which can be secured to the bicycle frame and support the lock without rattling or permitting the lock to mar the frame as is so common when the lock itself is clasped to the frame, and at the same time be simple, effective and inexpensive to manufacture.

In the drawing, Fig. 1, is a perspective view, partly broken away, of a preferred form of my improved lock holder. Fig. 2 shows the manner of mounting the support upon the handlebar post, and Fig. 3. is a plan view of the holder with a lock inserted therein.

Referring more particularly to Fig. 1, of the drawing, it will be seen that this embodiment of the holder proper is composed of two metallic pieces 10 and 11. The part 10 forming the main portion and part 11 forming a clamp for holding the parts together. The main portion 10 is rolled up at its sides to form tubes 12 through which the shackles of the lock can pass. In order to reduce the possibility of rattling or slipping, these tubes are provided with a rubber bushing 13 which will snugly fit the aforesaid lock shackle.

After the parts 10 and 11 are secured together a hold 14 is formed in the center of the holder to facilitate securing the same to the frame of a bicycle or the like.

In Fig. 2, the lock holder is shown attached to the handlebar stem 15 by means of a stud 16, and when so attached to a bicycle it provides a very handy and novel support for the lock. The holder can however be secured to any part of the frame where a stud exists, for instance, it might be secured at the end of either one of the axles.

As stated above, the form of the lock which best suits this holder is one having a long shackle 17 and a removable body 18. After the holder has been secured to the frame of the bicycle the user after unlocking the lock inserts the shackle 17 through the tubes 12 and then presses the body 18 and shackle 17 together again as shown in Fig. 3, thus, securely locking the lock itself in the holder where it is securely held until again unlocked.

While I have shown and described my invention as composed of two metallic pieces and as applied to a bicycle, it should be understood that it can be made of a single metallic piece and has many other applications and it is, therefore, only limited by the scope and spirit of the following claims:

What I claim is:

1. A holder for locks of the removable shackle type having a main portion, and upturned portions formed on the sides of said main portion adapted to receive the shackle of the lock, whereby the same can be locked in said holder.

2. A holder for locks of the removable shackle type having a main portion, tubular portions formed on the sides of said main portion, and resilient means within said tubular portions for frictionally engaging the lock.

3. A holder for locks of the removable shackle type having a main portion, tubular portions formed on the sides of said main portion, and rubber bushings within said tubular portions for frictionally engaging the lock shackle.

4. A holder for locks having a main portion, tubular portions formed on the sides of said main portion, and a clamping member for securing said tubular portions and said main portion together.

5. In a holder for locks of the type described, a member having its ends rolled up to form tubular members, a second member adapted to secure the ends of said rolled up portions to said member and stiffen the said member, and resilient means within said tubular portions for preventing rattling of the lock when held in said holder.

6. A holder for locks having a main portion, a tubular portion formed on the side of said main portion adapted to receive the shackle of the lock, and means to prevent rattling of said lock within said tubular portion.

In testimony whereof I have hereunto subscribed my name this 31 day of October, 1925.

LOT F. BURKE.